(12) United States Patent
Moretti

(10) Patent No.: US 6,357,476 B1
(45) Date of Patent: Mar. 19, 2002

(54) HOT AND COLD WATER MIXING/DISTRIBUTING VALVE WITH THREE OR MORE OUTLETS

(75) Inventor: Alberto Moretti, Sarezzo (IT)

(73) Assignee: Project Service S.R.L. (IT)

( * ) Notice: Subject to any disclaimer, the term of this patent is extended or adjusted under 35 U.S.C. 154(b) by 0 days.

(21) Appl. No.: 09/573,041

(22) Filed: May 12, 2000

(51) Int. Cl.⁷ ............................................... F16K 11/12
(52) U.S. Cl. ....................................................... 137/597
(58) Field of Search ........................................ 137/597

(56) References Cited

U.S. PATENT DOCUMENTS 2,500,239 A * 3/1950 Bayette ....................... 137/597
2,847,027 A * 8/1958 Kumpman ................... 137/597
4,653,538 A * 3/1987 Tsutsui et al. ......... 137/625.46

* cited by examiner

Primary Examiner—Stephen M. Hepperle
(74) Attorney, Agent, or Firm—McGlew and Tuttle, P.C.

(57) ABSTRACT

A mixing valve that includes a distributor body and in this body two inlet passages for hot and cold water, separately and a water mixing chamber in communication with the inlet passages. Three or more water outlets from the mixing chamber are provided. A first valve is provided for the partial or total opening and closing of the hot and cold water inlet passages. A second valve is provided for selectively opening and closing each of the water outlets from the mixing chamber. A first rotating control member is provided for controlling the first valve and a second rotating control member is provided for controlling the second valve. The control members are coaxial.

20 Claims, 10 Drawing Sheets

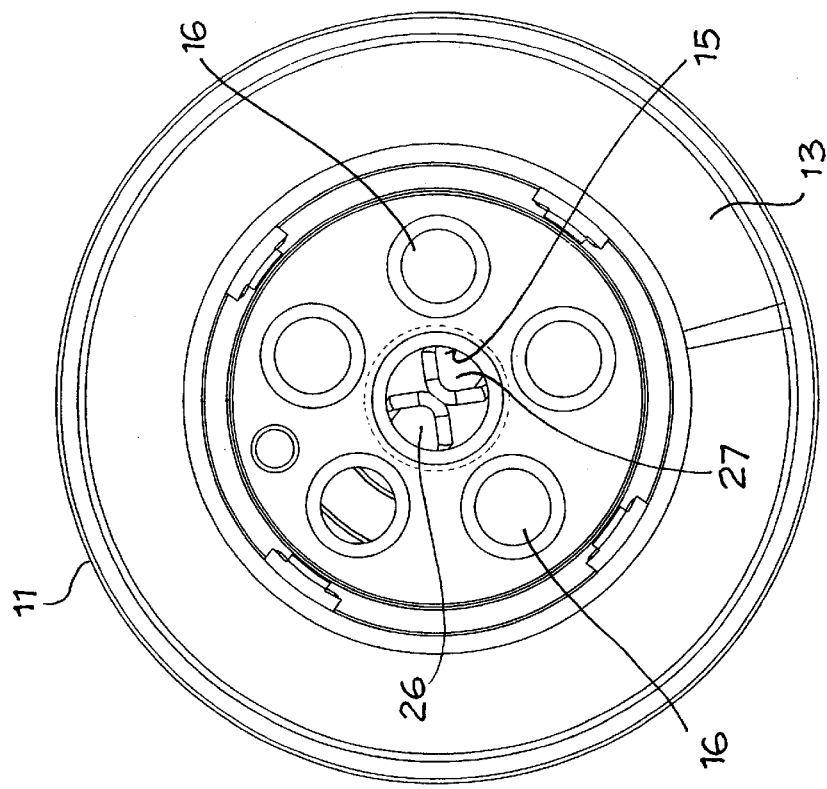
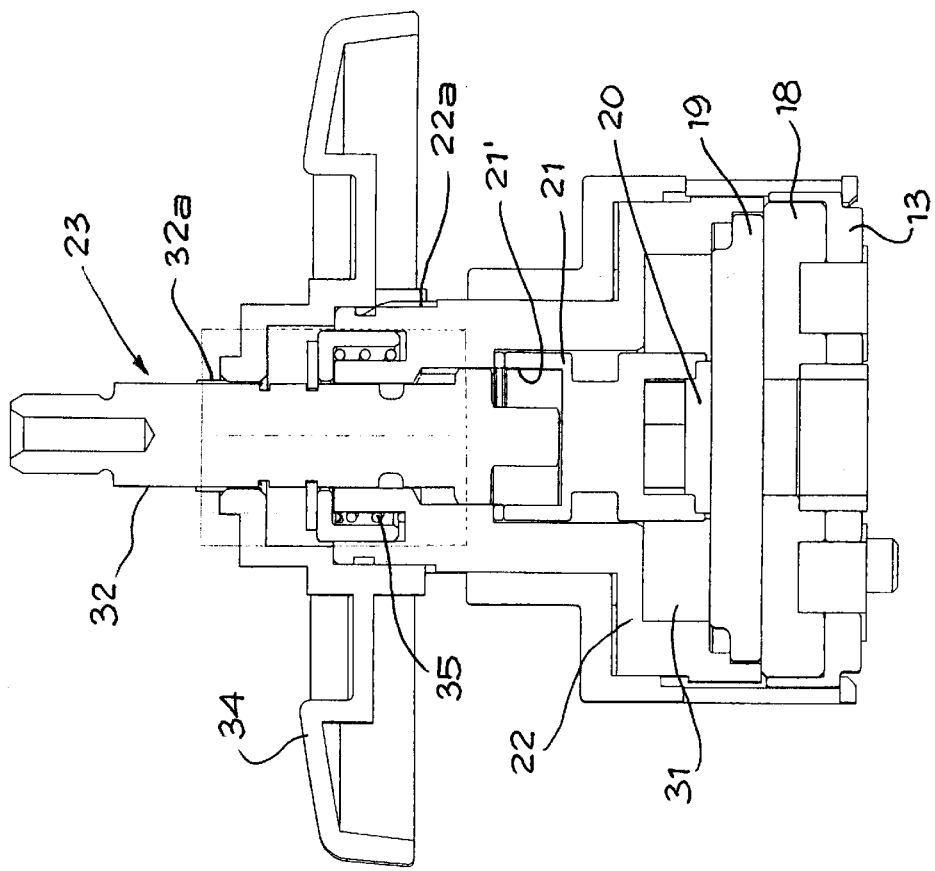

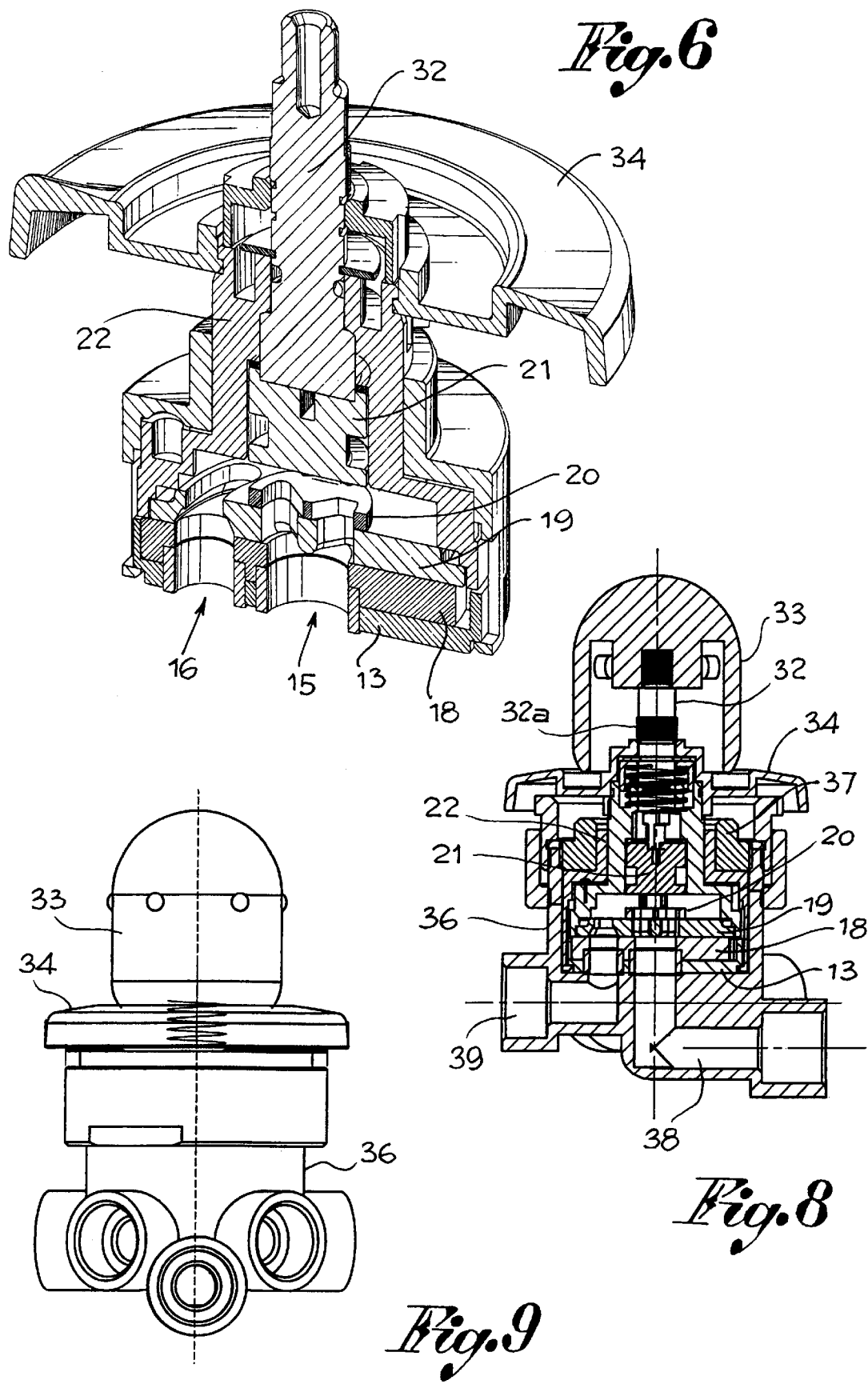

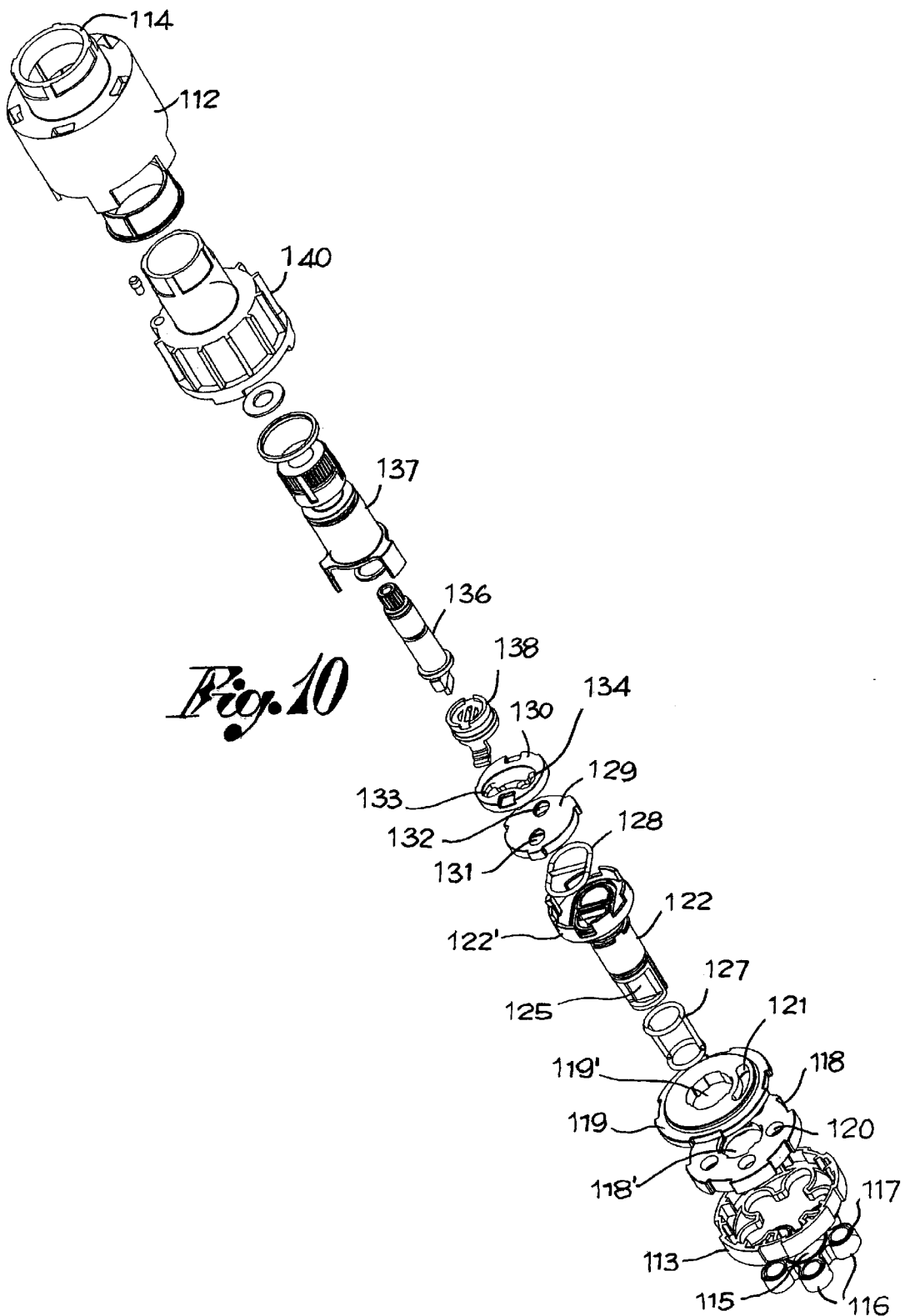

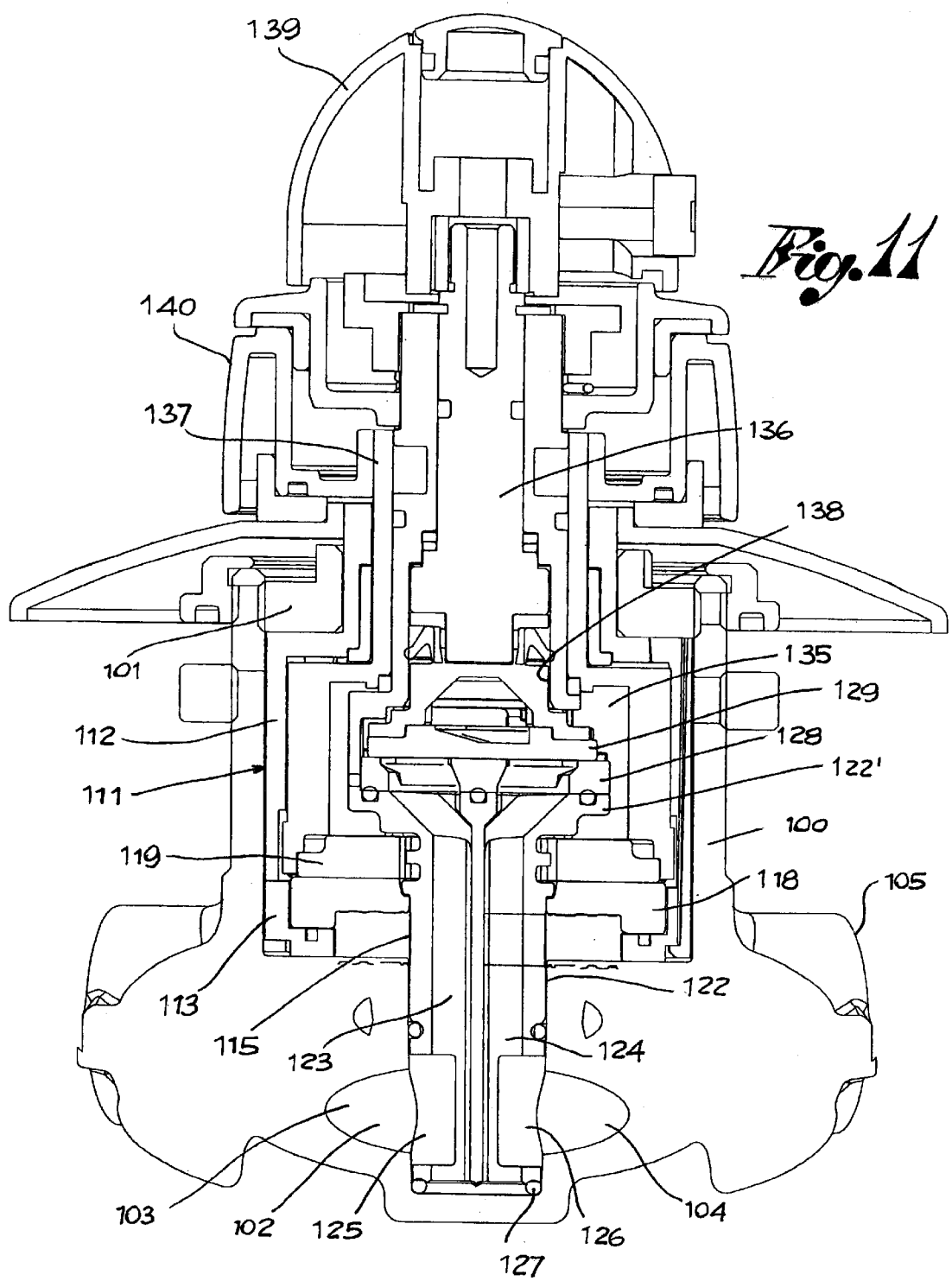

HOT AND COLD WATER MIXING/DISTRIBUTING VALVE WITH THREE OR MORE OUTLETS

FIELD OF THE INVENTION

The present invention pertains to hot and cold water mixing valves incorporating a valve device consisting of ceramic plates for the control of the incoming and outgoing water flows.

BACKGROUND OF THE INVENTION

Various embodiments of hot and cold water mixing valves are already known. However, they usually have only one outlet passage for the mixed water. This means that the outlet of such mixing valves may feed only one user, such as a bathtub, a wash basin, a shower, etc., and that places where a plurality of users combined in a single complex are provided, e.g., in a shower stall equipped with a fixed shower, a manual shower, a foot bath, nozzles for water massage, etc., would require the use of the same number of mixing valves or the recourse, as usually occurs, to additional flow deviators.

SUMMARY AND OBJECTS OF THE INVENTION

It is an object of the present invention to provide a mixing valve having three or more water outlets to solve the problems with feeding water to a plurality of separate users, without resorting to additional flow deviators and less to a usual mixing valve for any use.

Another object of the present invention is to provide a hot and cold water mixing valve that is a mixer and a deviator at the same time and thus is able to perform the dual function of mixing the incoming water and of selectively distributing the outgoing water to a plurality of users.

Another object of the present invention is to provide a mixing valve with three or more outlets, which may be designed as a cartridge unit that can be inserted into a distributor body having a plurality of attachments for connecting the various expected users thereto or whose components may be mounted directly in the distributor body.

These objects are accomplished, according to the present invention, with a mixing valve that comprises a distributor body and in this body:

two inlet passages for hot and cold water, separately;
a water mixing chamber in communication with the inlet passages;
three or more water outlets from the mixing chamber;
first valve or valve means for the partial or total opening and closing of the hot and cold water inlet passages;
second valve or valve means for selectively opening and closing each of the water outlets from the mixing chamber;
a first rotating member for controlling the first valve means;
a second rotating member for controlling the second valve means; and
the control members being coaxial.

In a particular embodiment, the distributor body has centrally a tank and the valve means are preassembled in the form of a "cartridge" inserted into the distributor body axially to the tank.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a view like that of FIG. 3, but in the selective position of opening/closing the outlets;

FIG. 5 is a view from the bottom of the mixing valve;

FIG. 6 is a section like that of FIG. 2, but in which the control members of the valve means are actuated by separate maneuvering means;

FIG. 8 is a sectional view of the mixing valve inserted into the distributor body;

FIG. 9 is an external view of the unit of FIG. 8;

FIG. 10 is an exploded perspective view of the components of the valve according to the present invention;

FIG. 11 is a section of the valve assembled and inserted into a distributor body;

DESCRIPTION OF THE PREFERRED EMBODIMENTS

Figure 1:
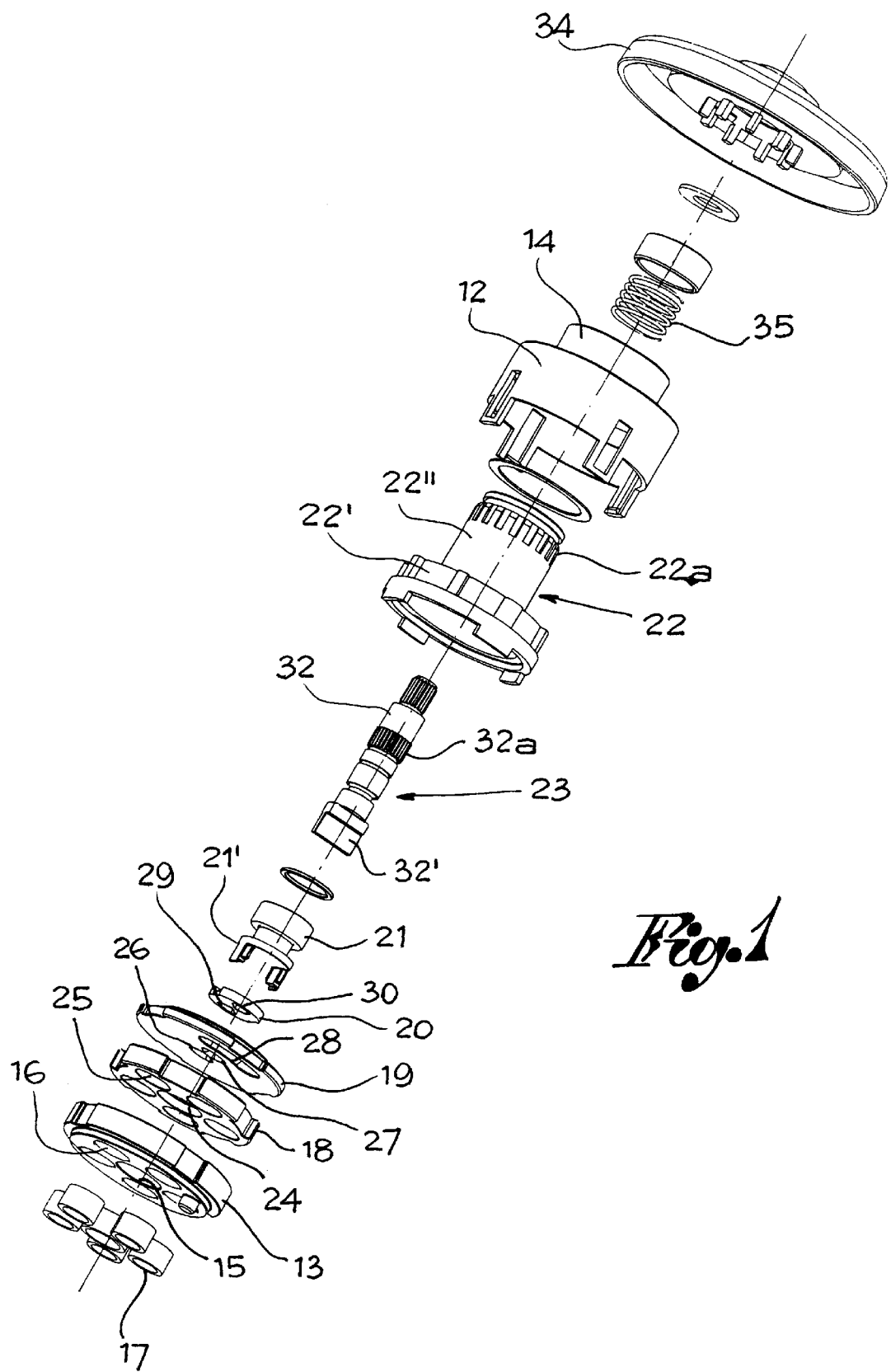
FIG. 1 is an exploded perspective view of the components of a mixing valve according to one embodiment of the present invention.
Figure 3:
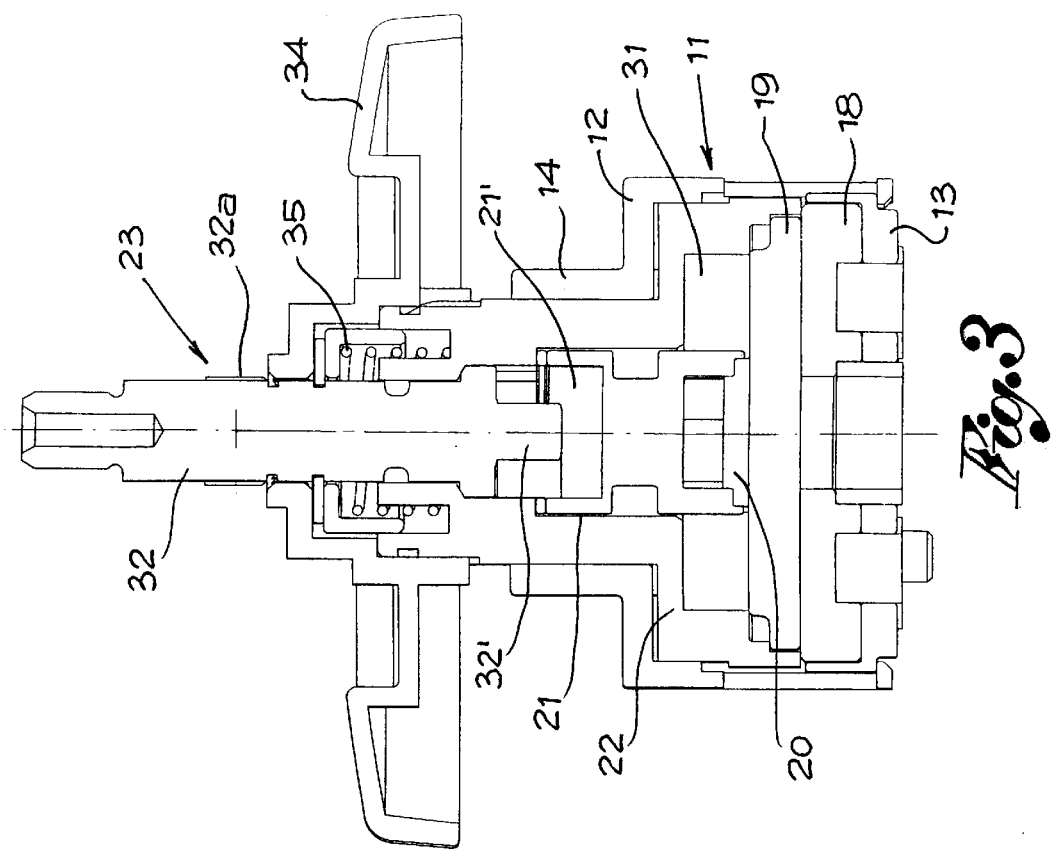
FIG. 3 is an axial section of the mixing valve of FIG. 2 in the position of opening/closing the water inlet passages.
Figure 2:
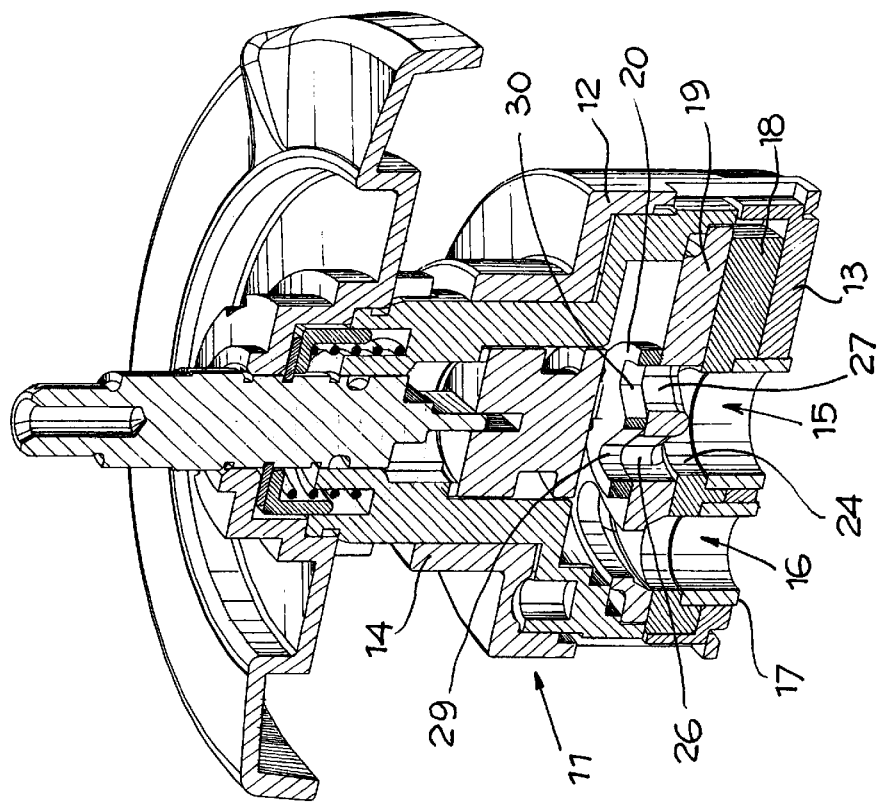
FIG. 2 is a perspective view of a section of the mixing valve of FIG. 1 assembled and with only one maneuvering means for the two coaxial control members.

Referring to the drawings in particular, in the example illustrated in FIGS. 1–9, the mixing valve has an external cover 11 formed by a hollow cylindrical body 12 closed at the base by a bottom 13 and having a coaxial neck 14 at the top. The bottom 13 is spring-applied to the cylindrical body 12 and has a central entrance hole 15 and, around this hole 15, at least three lateral outlet holes 16 (there are five in the drawings), on the same circumference and each with a seal 17.

The following are provided inside the cover 11, starting from the bottom 13: a fixed lower plate 18, an intermediate, rotating, distributing plate 19, an also rotating, upper interception plate 20, a first control member 21 for the rotation of the interception plate 20, a second control member 22 for the rotation of the distributing plate 19, and at least one maneuvering means or actuator 23.

The fixed and rotating plates 18–20 may be made of ceramic or another suitable material, the external cover and other functional components 21–23 are preferably made of plastic material.

More specifically, the fixed plate 18 rests and is fastened on the bottom 13 and has a central hole 24 and lateral holes 25 coinciding with the holes 15 and 16, respectively, which are provided in the bottom and also joined with the seals 17.

The distributing plate 19 rests on the fixed plate 18 with the possibility of rotating around its own geometric axis. Centrally, it has two inlet openings 26, 27, both corresponding to the central hole 24 of the fixed plate 18, and a lateral slot 28, in the shape of a circular sector and lying on the same circumference, of the lateral holes 25 of the fixed plate. Thus, with the rotation of the distributing plate 19, its central openings 26, 27 always remain in correspondence with the central hole of the fixed plate, while the slot 28 is brought and placed selectively in correspondence with at least one of the lateral holes 25.

The interception plate 20 rests on the distributing plate 19 with the possibility of rotating with its own geometric axis.

It has an external radius (or extent) no greater than the internal radius (or extent) of the slot 28 in such a way as to leave it uncovered and never to obstruct the slot 28. The interception plate 20 has two openings 29, 30, which are essentially triangular and can be positioned at a distance or in line, partially or totally, with the two central openings 26, 27 of the distributing plate 19 according to its rotation.

The first control member 21 consists of a rotating element which is arranged concentrically to and guided in rotation in the second control member 22 which in its turn has the shape of a sleeve with two diameters with a part 22' resting and guided in rotation in the cylindrical body 12 and a part 22" resting and guided in the neck 14 of the external cover 11.

The first and second control members 21 and 22 delimit or define between them and, define with the distributing plate 19, a mixing chamber 31 all around the interception plate 20. The mixing chamber 31 is therefore enclosed, surrounded and bounded by the control members 21, 22 and the distributing plate 19.

The first control member 21 is arranged above the interception plate 20 at a distance from same so as not to obstruct its openings 29, 30. It has, at the bottom, tongues 21' for dovetailing to the interception plate 20 and, at the top, a notch 21" in which engages, by means of a tang 32', a maneuvering shaft or actuating shaft 32 having a grip handle 33, the shaft passing coaxially in the second member 22.

This second control member 22 also has, at the bottom, the tongues 22' for its dovetailing to the periphery of the distributing plate 19 and, at the top, above the neck of the cover 11, a toothed section 22a on which is flush fit a pulling hand grip 34 rotatingly arranged around the maneuvering shaft 32, between the tip of the second member 22 and the grip handle 33.

In one embodiment (FIGS. 2, 4), the shaft 32 is provided as a single means 23 for causing a selective rotation of the interception plate 20 by itself by means of the first control member 21 and of the distributing plate 19 by means of the second control member 22 and together with the distributing plate. Therefore, the shaft 32 can be moved axially between a stopped position, in which it causes the rotation of only the interception plate 20, and an advanced position for the rotation of the distributing plate 19. The shaft 32 is stressed axially by a spring 35, which tends to keep it normally in its stopped position; the shape assumes the advanced position by manually pushing it against the action of the spring. Externally, the shaft 32 has an intermediate broached zone 32, which is intended to be joined with a complementary broaching on the inside of the hand grip 34 only when the shaft is in its advanced position. When the shaft is in its stopped position, it is, however, disengaged from the hand grip which thus remains stationary.

In another embodiment (FIG. 6), the shaft 32 cannot be moved axially, the shaft with the related first control member 32, 21 and the grip with the related second control member 34, 22 are two separate and distinct control means. Therefore, the interception plate 20 is controlled by means of a rotation of the shaft, and the distributing plate 19 by means of the rotation of the grip 34, independently of the shaft.

Figure 7:
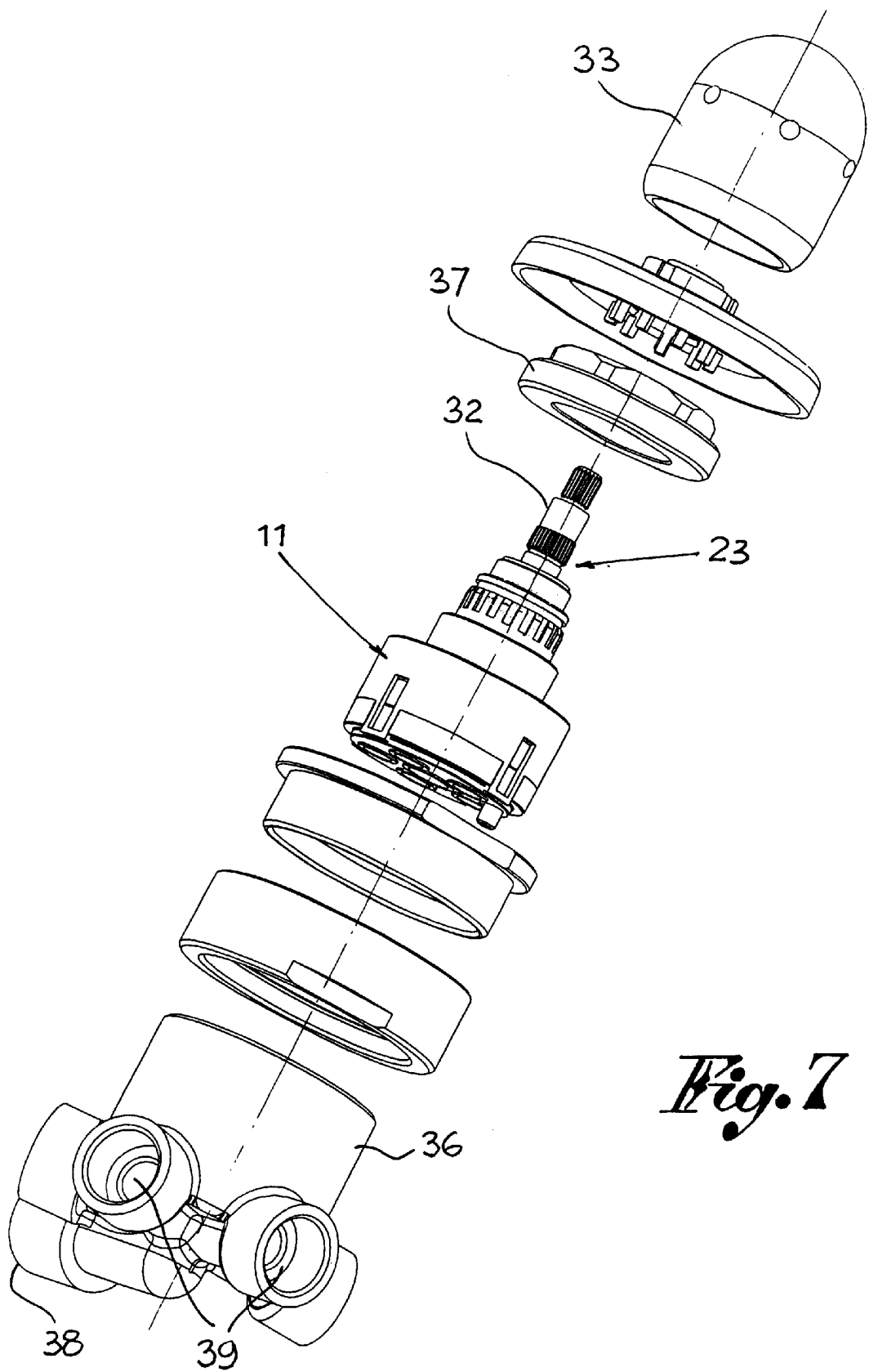
FIG. 7 is an exploded view of the assembled mixing valve, its maneuvering means and the distributor body intended to accommodate it.
Figure 12:
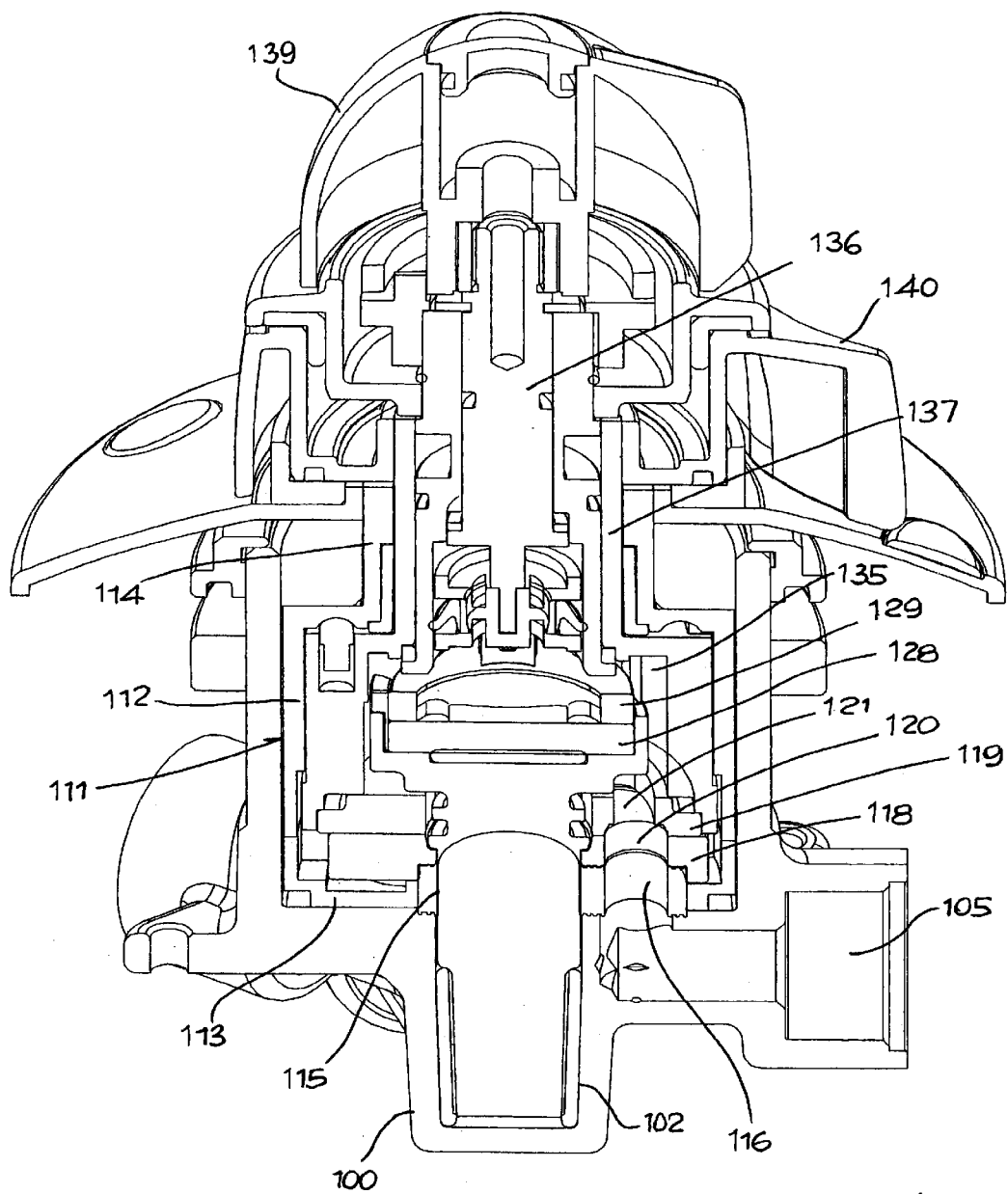
FIG. 12 is another section of the valve viewed according to another angular position as compared to that of FIG. 11.
Figure 13:
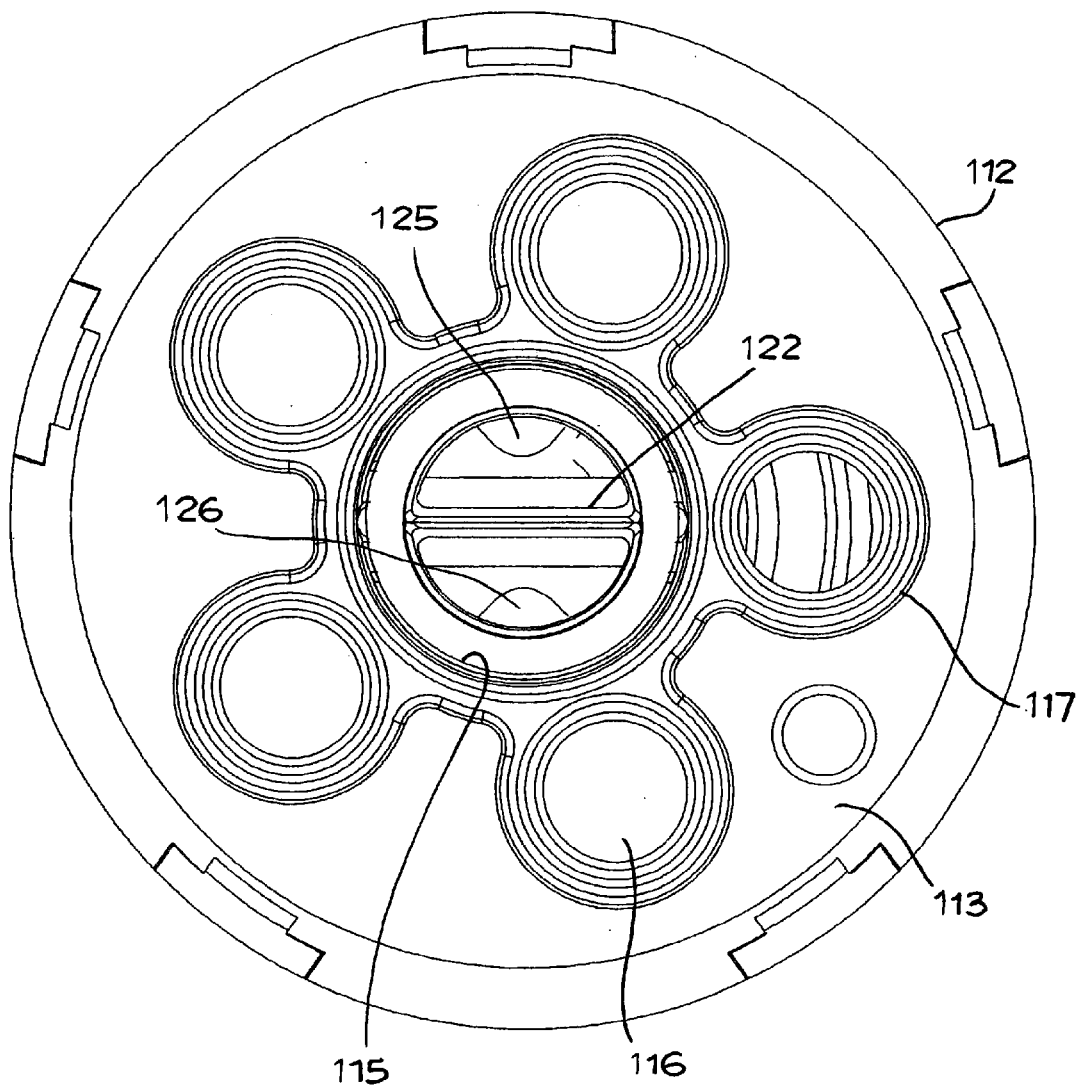
FIG. 13 is the valve viewed from its base (without distributor body)
Figure 14:
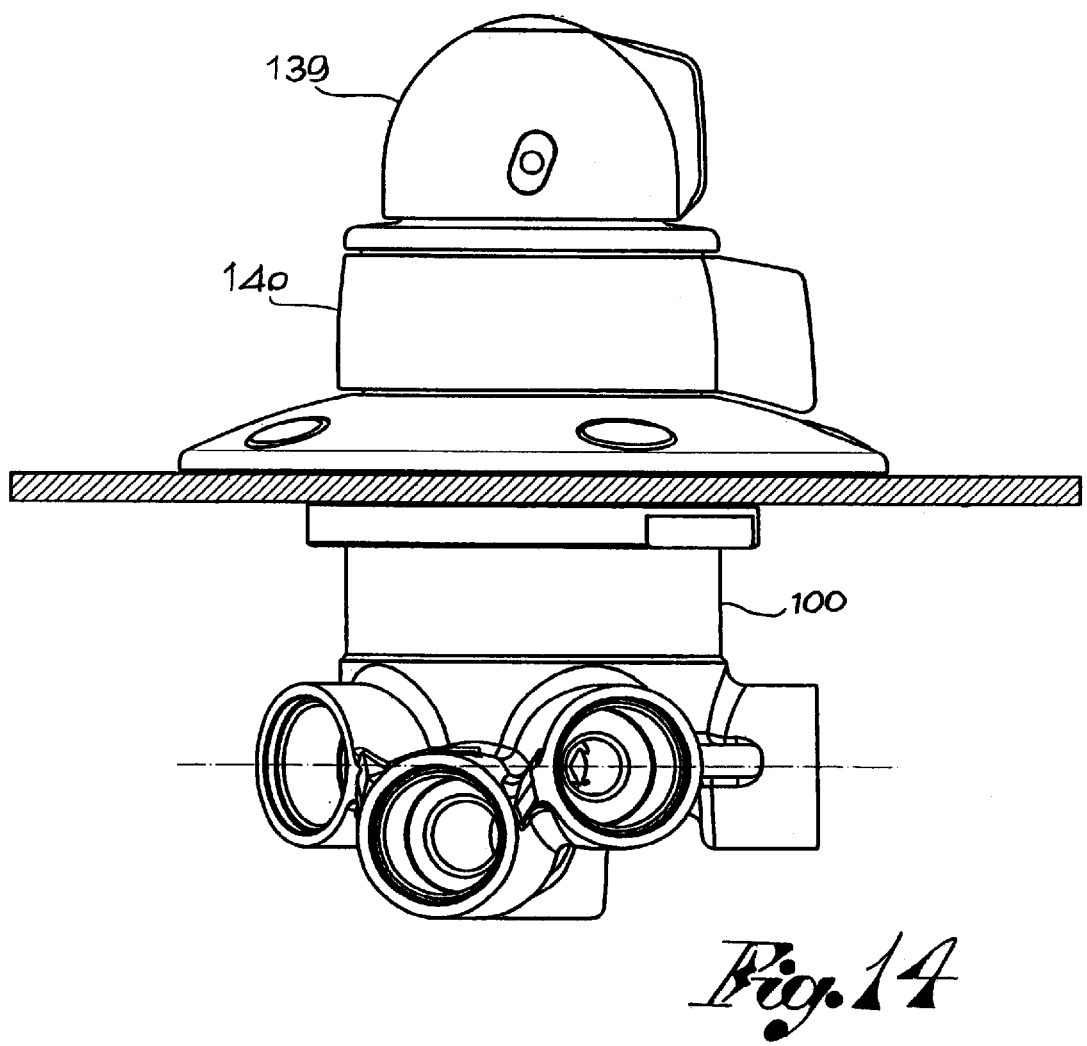
FIG. 14 is an external view of the unit of FIG. 11.

The mixing valve described is preferably equipped and preassembled as a "cartridge," then inserted as is into a distributor body 36, blocking it there with a ring nut 37 (FIGS. 7 and 8).

As an alternative, the mixing valve may be without an external cover, and its functional components may be inserted and assembled directly in the distributor body.

In each case, the distributor body 36 (FIGS. 7, 9) will have a hole 38 for the passage of two pipelines (not shown) for the supply of hot and cold water up to the two central holes 26, 27 of the distributing plate 19 and as many outlet channels 39 as there are coinciding outlets in the bottom 13 and in the fixed plate 18, and therefore, users to be fed.

In one of its modes of use, the valve can be used at the same time to mix hot and cold water and to selectively distribute it through a plurality of pathways.

In other words, the hot and cold water entering is led up to the openings 26, 27 of the interception plate 20, which, with the openings 29, 30 of the interception plate 20, constitute the separate inlet passages for hot and cold water. The plates 19, 20 in their turn constitute the first valve control means for the partial or total opening and closing of such passages. With the valve open, the hot and cold water entering passes in the mixing chamber 31, then flows between this to the user by way of the slot 28 of the distributing plate 19 and one or the other of the outlets will be positioned.

The outlets comprise the coinciding holes 15, 16 provided in the bottom 13 and in the fixed plate 18, and the distributing plate 19 and fixed plate 18 are the second valve means for selectively opening and closing such outlets and therefore for controlling the delivery of water to every single user.

Therefore, it is evident how by acting on the shaft 32 only (FIGS. 2, 4) or separately on the shaft 32 and on the grip 34, it is possible to open and close the valve and to manage each turn made and temperature of the water directed at each of three or more users without additional regulation and control means.

In another mode of use, the valve may be used only as a deviator to manage the distribution of water through three or more pathways. In this case, the valve shall arranged so as not to receive flows of hot and cold water separately, but only one flow of premixed water from a device arranged upstream. Therefore, the mixing chamber shall function only as a means for deviating the water from the inlet to the slot of the distributing plate.

A mixing valve 111, which is made in the form of a "cartridge" and can be inserted into a distributor body 110, blocking it there by means of a ring nut 101, is shown in the embodiment of FIGS. 10–14. The distributor body 100 has a central tank 102, to which arrive or are connected two separate inlet channels 103, 104, respectively, for hot and cold water, and around the tank, two, three or more water outlets 105 to the same number of separate users.

Therefore, the valve 11 1 comprises a hollow valve body 112, which is closed at the base by a bottom 113 and has, at the top, a neck 114. The bottom 113 has a central opening 115, and around same, at least two, three or more lateral outlet holes 116 on the same circumference. The opening 115 and the holes 116 may be defined by an element made of elastomer 117, which is inserted into the bottom 113 and acts as a hydraulic sealing means. The central opening 115 is coaxial to the tank 102 in the distributor body 100; the lateral holes 116 coincide with the outlet channels 105 of the distributor body.

At the bottom 113, a lower fixed plate 118 and a distributing plate 119 rotating on this fixed plate are provided on the inside of the valve body 112. Both plates 118, 119, which may be made of ceramic, have a central opening 118', 119', respectively, coinciding with the central opening 115 in the bottom 113.

The fixed plate 118 is fastened on the bottom 113 and is provided with lateral outlet holes 120 coinciding with the outlet holes 116 in the bottom 113, the plate resting on the element 117 for purposes of sealing. The distributing plate 119 is rotatable around its own axis and has an outlet slot 121 on the same circumference of the outlet holes 120 of the fixed plate 118. This slot can be selectively positioned in correspondence to at least one of the holes 120 according to the rotation of the distributing plate.

In the central openings of the bottom 113 and of the fixed and distributing plates 118, 119 is inserted a column 122, which extends, at the bottom, into the tank 102 of the distributor body 110 and which ends, at the top, with a head 122' arranged on the distributing plate. The column 122 has two channels 123, 124 for the inlet of hot and cold water, respectively. These, starting from the tank 102, lead to the head 122' and receive the hot and cold water at the level of the tank from two separate entrances 125, 126, which are provided in the distributor body 100 and can be connected in a known manner to corresponding water supply pipelines (not shown).

At the level of the tank, the hot and cold water entrances are separately hydraulically by a cage-like gasket 127 mounted around the column. At least one gasket is also mounted between the column and the rotating distributing plate.

On the head 122' of the column 122 is mounted, with the interposition of a gasket 128, a fixed mixing plate 129, on which rests a rotating mixing plate 130. These plates may also be made of a ceramic material. The fixed mixing plate 129 has two inlet openings 131, 132 coinciding with the outlets of the channels 123, 124 in the column. The rotating mixing plate 130 has two mixing openings 133, 134, which can be positioned at a distance from the inlet openings 131, 132 for the closing of the valve and in correspondence to the inlet openings to varying extent to vary the mixing ratios of the hot and cold water.

With the valve open, the water that enters through the channels of the column and through the openings of the mixing plates passes into a mixing chamber 135 around the head of the column and from this chamber to the distributing plate, which controls its delivery to the desired user.

A first control member 136 is provided for the rotation of the rotating mixing plate 130 and a second control member 137 for the rotation of the distributing plate 119.

The first control member 136 consists of a rotating element arranged coaxially and guided rotatingly in the second control member 137, which in its turn is mounted rotatingly in the neck 114 of the valve body 11. The first control member 135 is fastened to the mixing plate by means of an entrainer 138 and, at its tip, is fixed to a respective first grip handle 139. The second control member 137 has teeth 137' for engaging and entraining the respective distributing plate 119 and is also provided with a respective second grip handle 140, even though the control means might be different from those shown.

Therefore, acting on the first grip handle 139, it is possible to open and close, as needed, the valve by means of a rotation of the mixing plate 130, controlling the hot and cold water entering and their mixing ratios. Then acting on the second handle 140, it is possible to rotate the distributing plate 119 to deliver the water to one or another of the users connected to the various outlet channels of the distributor body.

While specific embodiments of the invention have been shown and described in detail to illustrate the application of the principles of the invention, it will be understood that the invention may be embodied otherwise without departing from such principles.

What is claimed is:

1. A hot and cold water mixing/distributing valve for the feeding of three or more users, the mixing/distributing valve comprising:

two separate inlet passages for hot and cold water coming from two conduction pipelines;

a mixing chamber in communication with said inlet passages;

three or more said water outlets from said mixing chamber to a same number of users;

a first rotating valve means for partial or total opening and closing of said hot and cold water inlet passages to said mixing chamber;

a second valve means for selectively opening and closing each of said outlets;

a first rotating control member for controlling said first valve means to bring about opening and closing of said inlet passages;

a second rotating control member for controlling said second valve means for selectively opening at least one of said outlets at a time, said first control member and said second control member being coaxial, said mixing chamber being bound by said control members together with said first valve means.

2. A mixing valve in accordance with claim 1, wherein:

said first and second valve means comprise superimposed plates made of ceramic, plastic or metal, including a fixed lower plate, an intermediate distributing plate rotating around its own geometric axis on said fixed plate, and an upper interception plate rotating around its own geometric axis around said intermediate plate, said distributing and interception plates forming said first valve means, said distributing and fixed plates forming said second valve means;

said two water inlet passages are defined by said first valve means and said three or more outlets are defined by said second valve means.

3. A mixing valve in accordance with claim 2, wherein:

said fixed plate has a central hole for said passage of at least one water conduction pipeline and three or more lateral holes at positions around said central hole, spaced substantially a same distance from said central hole and in communication with said users to be fed;

said distributing plate has at least one water inlet opening corresponding to said central hole of said fixed plate and a lateral slot having a circular arch and lying at substantially a same distance from said central hole as said lateral holes of said fixed plate, said slot being in permanent communication with said mixing chamber and capable of being selectively positioned to at least one at a time of said lateral holes of said fixed plate according to said rotation of said distributing plate;

said interception plate has at least one interception plate opening which can be positioned at a distance or in line, partially or totally with said central opening of said distributing plate according to said rotation of said interception plate in relation to said distributing plate, said interception plate having an external radius less than said internal radius of said arch-shaped slot and said interception plate opening communicating with said chamber for said inlet of water to be distributed.

4. A mixing valve in accordance with claim 1, wherein said first control member comprises a rotating element arranged concentrically to and rotating in said second control member, wherein said first control member is fixed in rotation with said interception plate, and in which said second control member is fixed in rotation with said distributing plate, said control members capable of being actuated separately and/or together.

5. A mixing valve in accordance with claim 4, wherein said two control members are selectively controlled in rotation by means of a single maneuvering shaft, said maneuvering shaft being movable axially between a stopped position for maneuvering only said first control member and an advanced position for maneuvering both of said control members together.

6. A mixing valve in accordance with claim 4, wherein said two control members are selectively controlled in rotation by means of a single maneuvering shaft said first control member and said second control member being actuated in rotation by said maneuvering shaft independent of one another.

7. A mixing valve in accordance with claim 2, wherein each said valve means and said control members are preassembled as a preassembled unit in a cartridge body or cover, said cartridge body or cover having a bottom with a central hole and lateral holes coinciding with those of said fixed plate, and in which said preassembled unit is arranged and blocked in a said cartridge body or cover has said passage for water conduction pipes and three or more channels which can be connected to said users.

8. A water distribution valve for feeding of three or more users, comprising:
an inlet passage for an inlet of premixed water through a conduction pipeline;
a chamber in communication with said inlet passage;
three or more water outlets from said chamber to the users;
a first rotating valve means for partial or total opening and closing said inlet passage to said chamber;
a second valve means for selectively opening and closing each of said outlets;
a first rotating control member for controlling said first valve means to bring about said opening and closing of said inlet passage;
a second rotating control member for controlling said second valve means for selectively opening at least one of said outlets at a time, and where said control members are coaxial, and said chamber is defined by said control members and said first valve means.

9. A mixing valve in accordance with claim 8, wherein:
said first and second valve means comprise superimposed plates made of ceramic, plastic or metal, including a fixed lower plate, an intermediate distributing plate rotating around its own geometric axis on said fixed plate, and an upper interception plate rotating around its own geometric axis around said intermediate plate, said distributing and interception plates forming said first valve means, said distributing and fixed plates forming said second valve means;
said two water inlet passages are defined by said first valve means and said three or more outlets are defined by said second valve means.

10. A mixing valve in accordance with claim 9, wherein:
said fixed plate has a central hole for said passage of at least one water conduction pipeline and three or more lateral holes at positions around said central hole, spaced substantially a same distance from said central hole and in communication with said users to be fed;
said distributing plate has at least one water inlet opening corresponding to said central hole of said fixed plate and a lateral slot having a circular arch and lying at substantially a same distance from said central hole as said lateral holes of said fixed plate, said slot being in permanent communication with said mixing chamber and capable of being selectively positioned to at least one at a time of said lateral holes of said fixed plate according to said rotation of said distributing plate;
said interception plate has at least one interception plate opening which can be positioned at a distance or in line, partially or totally with said central opening of said distributing plate according to said rotation of said interception plate in relation to said distributing plate, said interception plate having an external radius less than said internal radius of said arch-shaped slot and said interception plate opening communicating with said chamber for said inlet of water to be distributed.

11. A mixing valve in accordance with claim 8, wherein said first control member comprises a rotating element arranged concentrically to and rotating in said second control member, wherein said first control member is fixed in rotation with said interception plate, and in which said second control member is fixed in rotation with said distributing plate, said control members capable of being actuated separately and/or together.

12. A mixing valve in accordance with claim 11, wherein said two control members are selectively controlled in rotation by means of a single maneuvering shaft, said maneuvering shaft being movable axially between a stopped position for maneuvering only said first control member and an advanced position for maneuvering both of said control members together.

13. A mixing valve in accordance with claim 11, wherein said two control members are selectively controlled in rotation by means of a single maneuvering shaft said first control member and said second control member being actuated in rotation by said maneuvering shaft independent of one another.

14. A mixing valve in accordance with claim 9, wherein each said valve means and said control members are preassembled as a preassembled unit in a cartridge body or cover, said cartridge body or cover having a bottom with a central hole and lateral holes coinciding with those of said fixed plate, and in which said preassembled unit is arranged and blocked in a said cartridge body or cover has said passage for water conduction pipes and three or more channels which can be connected to said users.

15. A hot and cold water mixing/distributing valve for selective feeding two or more users, comprising:
a distributor body with inlet channels, which can be connected to two pipelines for separate supply of hot water and cold water, and with said two or more water outlets to two or more users;

a first valve mounted in said distributor body on an inside of said distributor body;

a chamber for mixing hot and cold water coming from said inlet channels, said first valve controlling said passage of hot and cold water to said mixing chamber;

a second valve selectively controlling the outlet of water from said mixing chamber to each of said outlets to said users;

a first rotating control member for the control of said first valve;

a second rotating control member for the control of said second valve, said distributor body having a tank centrally, and said hot and cold water inlet channels flowing into said tank and a column extends axially from said tank to said mixing chamber, passing through said second valve and has a top head at a level of said mixing chamber, said column defining two separate channels for passage of said hot and cold water, respectively, from said tank and each having an outlet on said top head, said first valve being arranged on said head and comprising a fixed mixing plate which has two inlet openings coinciding with said outlets of said separate channels and a rotating mixing plate with two inlet openings, which can be positioned in partial or total correspondence to said openings of said fixed plate to control said ratios of mixed hot and cold water or at a distance from said openings of said fixed plate to stop said distribution of water, said rotating plate being rotated with said first control member, said second valve comprising a fixed distribution plate with as many outlets, as holes coinciding with said outlets of said distributor body and a rotating distributing plate with at least one outlet slot, which can be selectively positioned in correspondence to each outlet hole of said fixed distributing plate, said rotating distributing plate being rotated with said second control member.

16. A mixing/distributing valve in accordance with claim 15, wherein said components of the valve are preassembled in said valve body forming a cartridge that can be inserted into said distributor body.

17. A mixing/distributing valve in accordance with claim 15, wherein said components of said valve are mounted and assembled in said distributor body.

18. A fluid distribution valve comprising:

an inlet opening;

a chamber in communication with said inlet opening;

three or more water outlets from said chamber;

a first valve movable to open and close communication between said inlet opening and said chamber;

a second valve selectively openable and closable of each of said outlets;

a first rotating control member controllable of said first valve to bring about opening and closing of said inlet opening;

a second rotating control member controllable of said second valve for selectively opening and closing said outlets, said control members being arranged coaxial, and said control members together with said first valve defining said chamber.

19. A valve in accordance with claim 18, wherein:

first and second inlet ducts are arranged in said inlet opening;

said first valve selectively opens and closes communication between said first and second ducts and said chamber to mix fluid from said fist and second inlet ducts in said chamber.

20. A valve in accordance with claim 18, wherein:

said first and second valves are formed from a plurality of disks.

* * * * *